Figure 1:
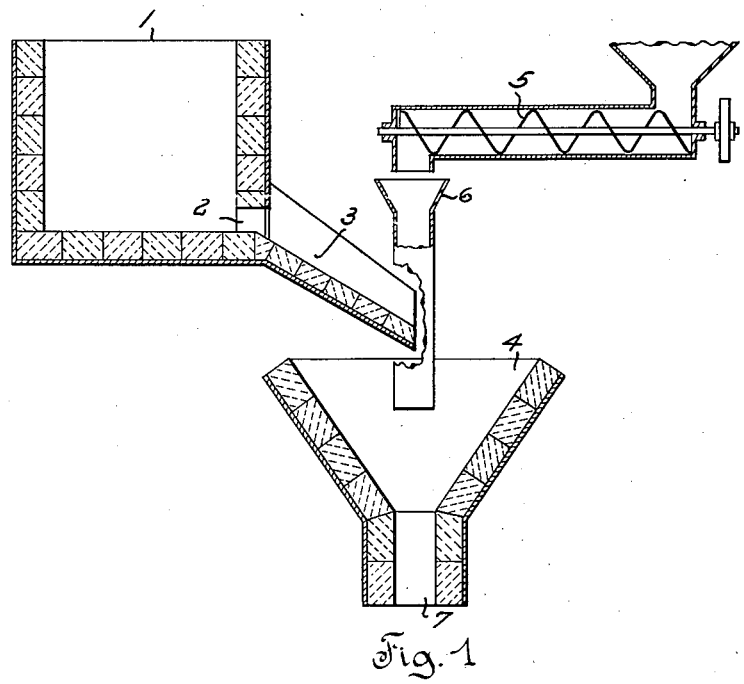

Feb. 20, 1934.   R. C. NEWHOUSE   1,947,488

METHOD OF PRODUCING CONSTRUCTION MATERIAL

Filed May 21, 1932

Inventor

Ray C. Newhouse.

Patented Feb. 20, 1934

1,947,488

UNITED STATES PATENT OFFICE 1,947,488

METHOD OF PRODUCING CONSTRUCTION MATERIAL

Ray C. Newhouse, Wauwatosa, Wis.

Application May 21, 1932. Serial No. 612,765

16 Claims. (Cl. 49—77.5)

This invention relates to an improvement in construction materials and a method of producing same, the invention being particularly applicable to the production of a light mineral aggregate to be used in Portland cement concrete.

An object of the invention is to provide an improved construction material which can be produced at low cost and which is light in weight and has good heat insulating qualities.

A further object of the invention is to provide a light weight material which is fire-proof, moisture-proof, mold-proof and vermin-proof.

A more specific object of the invention is to treat hot blast furnace slag in such a way that when cooled it may be crushed into suitable size to be used as a light mineral aggregate for Portland cement concrete.

A further object of the invention is to provide a method of producing from blast furnace slag slabs or blocks of material containing a large volume of air or gas space.

It has heretofore been proposed to use a material such as finely divided aluminum with Portland cement concrete to produce walls light in weight and with heat insulating qualities. This is objectionable not only on account of cost but also because it is difficult to determine in advance the exact volume which will be occupied by the expanded concrete.

Another method of producing a light weight concrete is the use of boiler cinders. Such use is limited on account of the scarcity of suitable materials, as many cinders are too dense to form a good insulator.

In attaining the objects of my invention, I preferably use hot blast furnace slag or the slag from other metallurgical furnaces. The slag in a molten condition is mixed with a ground carbonate such as ground limestone or ground magnesite. The heat of the slag causes dissociation of the carbon dioxide gas from the carbonate. As this reaction is endothermic, the temperature of the slag is reduced by the sensible heat required to heat the carbonate and by the heat necessary to liberate the carbon dioxide. The evolved carbon dioxide from the separate particles of carbonate forms small gas pockets throughout the mass which produce a material light in weight and having good heat insulating qualities.

Where a suitable carbonate is not available at low cost or where the temperature of the slag is not sufficient to cause the proper evolution of the carbon dioxide, ground gypsum may be mixed with the molten slag. It is well known that a relatively moderate heat causes the liberation of three fourths of the combined water of gypsum, which is a compound with the proportion of one molecule of calcium sulphate and two molecules of water. The water liberated forms a superheated steam which causes small gas pockets within the mass, thereby producing a material having good heat insulating qualities. In addition the calcined gypsum or plaster of Paris has better heat insulating qualities than most cementing materials. Where a very hot slag is mixed with gypsum, sufficient plaster of Paris may be formed to produce an appreciable quantity of cementing material.

A further advantage of the use of gypsum with the hot slag is that, since the liberation of water from the gypsum continues down to a temperature of approximately 200° F., the formation of superheated steam continues long after the slag has solidified. Where an excess of gypsum is used this results in a disruption of the solidified mass, making it more easily excavated and crushed. Also, on account of the endothermic reaction within the mass, it is quickly cooled to a temperature where it may be excavated with power driven shovels or other excavators.

A disadvantage in the use of gypsum is that where the material is used with Portland cement to form concrete, the presence of considerable quantities of calcium sulphate would be detrimental to the cement. Where the expanded slag is used with calcined gypsum as a binder, the use of gypsum for causing the expansion is in no way detrimental.

When casting slab or blocks without the use of a cement, I prefer to use a carbonate such as ground limestone to produce the gas spaces within the mass. The evolution of carbon dioxide will cease at a relatively high temperature, so that there will be less danger of disruption of the solidified mass after it has cooled.

The gas forming material should be added to the slag when the latter has sufficient viscosity to retain a considerable amount of gas bubbles within the mass. If the temperature of the slag is too high for best results, its temperature may be reduced by adding an excess of the gas forming material, as the evolution of the gas is an endothermic reaction which will lower the temperature of the slag.

As any finely divided material such as ground limestone or ground gypsum tends to float on top of a body of molten slag, on account of the greater density of the latter, it is desirable to provide means for mixing the ground material with the molten slag.

The accompanying drawing shows an arrangement of apparatus suitable for mixing the gas forming ground material with the molten slag.

Figure 2:
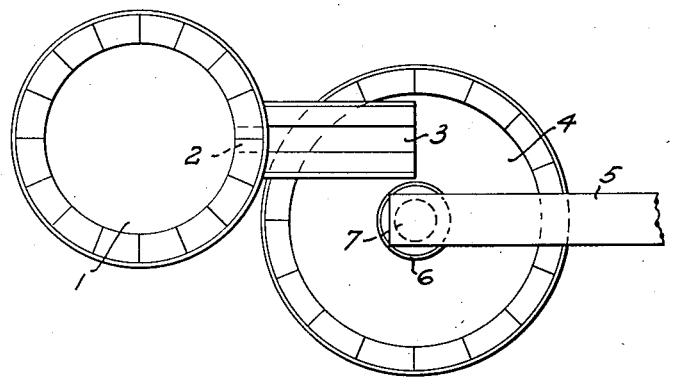

Figure 1 is a sectional elevation of the apparatus. Figure 2 is a plan view.

1 is a refractory lined receptacle for the molten slag, with a discharge orifice 2, and an inclined spout 3. 4 is a funnel shaped mixing receptacle to receive the molten slag and produce a whirling motion of the same. 5 is a feed controlling means for the gas forming ground material. 6 represents a spout through which the ground material is introduced to the mixing receptacle 4. 7 represents the discharge opening from the mixing receptacle 4, from which the material is allowed to fall on the ground or into a suitable mold for cooling and the evolution of gas.

The molten slag from the receptacle 1, flows through the orifice 2 and the spout 3 and is introduced tangentially to the receptacle 4. This produces a vortex in the receptacle 4, into the center of which the ground material is introduced from the feeder 5 through the spout 6. As the molten slag is discharged through the opening 7, the ground material is in the center of the discharge opening. The molten slag, as it falls on the ground or into a suitable mold, flows outwardly, carrying the ground material under the surface and producing a proper mixture of the two materials.

If the solidified mass is to be used as a concrete aggregate, the molten material is generally allowed to fall on the ground. After cooling it may be excavated and crushed to suitable sizes.

If the solidified mass is to be used in its form as cast in molds, it is held in the mold until it has sufficiently hardened and cooled, after which it may be removed from the mold.

Pure calcium carbonate contains 44 percent by weight of carbon dioxide, and limestone consists principally of calcium carbonate. One pound of carbon dioxide has a volume of approximately eight cubic feet at a temperature of 32° F. and at atmospheric pressure. At the temperature of slag leaving the blast furnace one pound of carbon dioxide has a volume of more than forty cubic feet at atmospheric pressure. It is therefore evident that only a small percentage of ground limestone is needed to cause a large expansion in the molten slag. The amount of carbon dioxide escaping from the slag will vary with the viscosity of the slag, the latter varying with the analysis of the slag and its temperature.

While the presence of any considerable amount of free lime in the slag would be detrimental to Portland cement concrete, the presence of the free lime is prevented by its combination with the slag to form calcium silicate or calcium aluminate.

Where the treated material is allowed to cool and is afterwards crushed for concrete the presence of an excess of ground limestone can only be detrimental by causing the resulting material to contain a greater volume of air space than desired. If the molten slag is to be cast into slabs or blocks and used in such form, the quantity of ground limestone should be limited to that quantity which can be calcined before solidification of the slag, as the evolution of carbon dioxide after solidification of the mass may cause its disruption.

When the mixture of molten material and ground limestone or gypsum or other gas forming material is poured into molds to form slabs or blocks without the use of another cementing material, the amount of the mixture poured into any mold should be such as to only slightly more than fill the mold when expanded, although any excess material which overflows may be crushed and used as a concrete aggregate. It is desirable to partially close the top of the mold, leaving a slot for the escape of any excess material, so that any excess adhering to the desired shape may easily be broken off when cold.

I have described an improved construction material and a method of producing same by mixing a ground carbonate of ground gypsum with molten slag, but it is obvious that other molten materials and other materials forming gas by heating than those here described may be used, and I aim to cover all such uses which do not depart from the spirit and scope of my invention as set forth in the following claims.

It is claimed and desired to secure by Letters Patent:

1. The method of forming a construction material containing gas pockets which comprises, mixing a molten slag with a finely divided carbonate and allowing the mixture to cool.

2. The method of forming a construction material containing gas pockets which comprises, mixing a molten slag with finely divided gypsum and allowing the mixture to cool.

3. The method of forming a construction material containing gas pockets which comprises, mixing molten slag with ground limestone and allowing the mixture to cool.

4. The method of forming a construction material containing gas pockets which comprises, mixing molten blast furnace slag with ground limestone and allowing the mixture to cool.

5. The method of forming a light concrete aggregate which comprises, mixing a molten slag with a finely divided carbonate, allowing the mixture to cool and crushing the cooled material.

6. The method of forming a light concrete aggregate which comprises, mixing molten slag with ground limestone, allowing the mixture to cool and crushing the cooled material.

7. The method of forming a light concrete aggregate which comprises, mixing molten blast furnace slag with ground limestone, allowing the mixture to cool and crushing the cooled material.

8. The method of forming a construction material with gas pockets which comprises, mixing a molten slag with a finely divided carbonate, pouring the mixture into a suitable mold and allowing the mixture to cool.

9. The method of forming a construction material with gas pockets which comprises, mixing a molten slag with finely divided gypsum, pouring the mixture into a suitable mold and allowing the mixture to cool.

10. The method of forming a construction material with gas pockets which comprises, mixing molten blast furnace slag with ground limestone, pouring the mixture into a suitable mold and allowing the mixture to cool.

11. The method of expanding hot slag which comprises spreading fluid slag over a surface extending downwardly toward a common center, distributing a gas evolving solid over the surface of the slag, discharging said materials through an orifice at said common center, collecting the mixed materials and allowing the mixture to cool.

12. The method of expanding hot blast furnace slag which comprises spreading fluid slag over a surface extending downwardly toward a common center, distributing a gas evolving solid over the surface of the slag, discharging said materials through an orifice at said common center, collecting the mixed materials and allowing the mixture to cool.

13. The method of forming a construction material containing gas pockets which comprises, mixing a molten material having sufficient viscosity to retain gas bubbles with a solid dissociating gas when heated and allowing the mixture to cool.

14. The method of forming a construction material containing gas pockets which comprises, mixing molten slag having sufficient viscosity to retain gas bubbles with a solid dissociating gas when heated and allowing the mixture to cool.

15. The method of forming a light concrete aggregate which comprises, mixing molten slag having sufficient viscosity to retain gas bubbles with a solid dissociating gas when heated, allowing the mixture to cool and crushing the cooled material.

16. The method of forming a construction material containing gas pockets which comprises, mixing a molten material having sufficient viscosity to retain gas bubbles with a solid dissociating gas when heated, pouring the mixture into a suitable mold and allowing the mixture to cool.

RAY C. NEWHOUSE.